(12) United States Patent
Xin

(10) Patent No.: US 7,450,067 B2
(45) Date of Patent: Nov. 11, 2008

(54) INCOMING WAVE NUMBER ESTIMATION METHOD, INCOMING WAVE NUMBER ESTIMATION DEVICE, AND RADIO DEVICE

(75) Inventor: Jingmin Xin, Xi'an (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/970,645

(22) Filed: Jan. 8, 2008

(65) Prior Publication Data
US 2008/0129596 A1  Jun. 5, 2008

Related U.S. Application Data

(63) Continuation of application No. PCT/JP2005/012758, filed on Jul. 11, 2005.

(51) Int. Cl.
*G01S 3/00* (2006.01)
(52) U.S. Cl. ........................ 342/378; 702/196
(58) Field of Classification Search ................ 342/378; 702/196–197
See application file for complete search history.

(56) References Cited

U.S. PATENT DOCUMENTS

| | | | |
|---|---|---|---|
| 6,144,711 A | 11/2000 | Raleigh et al. | |
| 6,446,025 B1 | 9/2002 | Nakamura et al. | |
| 6,897,807 B2 | 5/2005 | Kishigami et al. | |
| 2005/0285788 A1* | 12/2005 | Xin | 342/432 |
| 2006/0007043 A1* | 1/2006 | Xin | 342/417 |
| 2006/0212237 A1* | 9/2006 | Xin | 702/65 |
| 2006/0224655 A1* | 10/2006 | Shirai et al. | 708/607 |
| 2007/0139268 A1* | 6/2007 | Xin | 342/417 |

FOREIGN PATENT DOCUMENTS

| | | |
|---|---|---|
| JP | 11-281725 | 10/1999 |
| JP | 2002-243826 | 8/2002 |
| WO | 2005/001504 | 1/2005 |
| WO | WO 2007/007390 A1 * | 1/2007 |

OTHER PUBLICATIONS

Priority Document PCT/JP2005/012758.*

(Continued)

*Primary Examiner*—Thomas H. Tarcza
*Assistant Examiner*—Fred H. Mull
(74) *Attorney, Agent, or Firm*—Katten Muchin Rosenman LLP

(57) ABSTRACT

An incoming wave number estimation device for receiving incoming radio waves by an array antenna in which a plurality (=M) of antenna elements are linearly arrayed with a same element spacing, and estimating the number of the incoming radio waves, including: a correlation matrix creation section for removing a diagonal element from a predetermined row or column constituting an M×M array covariance matrix, and creating a correlation matrix by extracting a predetermined $\bar{p}$ number of correlations from (M−1) number of correlations after the diagonal element is removed while sequentially shifting one element at a time, and arraying the $\bar{p}$ number correlations in a matrix; an estimation matrix creation section for creating an estimation matrix for estimating the incoming wave number using the correlation matrix; a QR decomposition section for performing QR decomposition on the estimation matrix; and an incoming wave number determination section for determining the number of incoming radio waves based on each row element of an upper triangular matrix factor obtained by the QR decomposition.

19 Claims, 11 Drawing Sheets

OTHER PUBLICATIONS

Certified Translation of Priority Document PCT/JP2005/012758.*
International Search Report dated Oct. 18, 2005, from the corresponding International Application.
Jingmin Xin et al. "Subspace-Based Adaptive Direction Estimation and Tracking in Multipath Environment", 2005 IEEE International Conference on Acoustics, Speech and Signal Processing (ICASSP), vol. 4, Mar. 2005, pp. 957-960.
S. Unnikrishna Pillai et al. "Forward/Backward Spatial Smoothing Techniques for Coherent Signal Identification" IEEE Transactions on Acoustics, Speech and Signal Processing, vol. 37, No. 1, Jan. 1989, pp. 8-15.
Noriaki Takabe, et al. "DOA Estimation Based on the Relation between DOAs and Non-Diagonal Correlation Matrix Elements" IEICE Technical Report, vol. 104, No. 680, Mar. 4, 2005, pp. 139-144.
Ralph O. Schmidt "Multiple Emitter Location and Signal Parameter Estimation" IEEE Transactions on Antennas and Propagation, vol. AP-34, No. 3, Mar. 1986, pp. 276-280.
Tie-Jun Shan, et al. "On Spatial Smoothing for Direction-of-Arrival Estimation of Coherent Signals" IEEE Transactions on Acoustics, Speech and Signal Processing, vol. ASSP-33, No. 4, Aug. 1985, pp. 806-811.
Mati Wax, et al. "Detection of Signals by Information Theoretic Criteria" IEEE Transactions on Acoustics, Speech and Signal Processing, vol. ASSP-33, No. 2, Apr. 1985, pp. 387-392.

* cited by examiner

INCOMING WAVE NUMBER ESTIMATION METHOD, INCOMING WAVE NUMBER ESTIMATION DEVICE, AND RADIO DEVICE

BACKGROUND OF THE INVENTION

The present invention relates to an incoming wave number estimation method, incoming wave number estimation device and radio device, and more particularly to an incoming wave number estimation method, incoming wave number estimation device and radio device for receiving incoming radio waves by an array antenna, where a plurality (=M) of antenna elements are linearly arrayed with a same element spacing, and estimating the number of incoming radio waves.

Recently research and development using an adaptive array antenna for mobile communication is receiving attention, and a plurality of antenna elements arranged in different spatial positions in a certain form is called an "array antenna". Estimation of an incoming direction of a radio wave (may also be called a "signal" from the standpoint of signal processing), which enters the antenna, is a critical elemental technology of an adaptive array antenna. In an actual mobile communication system, signals transmitted from a user (mobile terminal) are often reflected by buildings, and enter a base station array antenna via a direct path and reflection paths. Therefore the issue of estimating incoming directions of multiple waves in a multi-path propagation environment is very important.

For estimating incoming directions of signals, a subspace based method is well known, which uses the orthogonality of a signal subspace and noise subspace, due to the advantages in terms of estimation accuracy and calculation volume. A typical example thereof is MUSIC (Multiple Signal Classification) (see Non-patent Document 1 listed on page 10). As a means of handling problems in estimating incoming directions of multiple waves having a complete correlation, a subspace based method with spatial smoothing, which is spatial smoothing based MUSIC, is well known (see Non-patent Document 2 and Non-patent Document 3 listed on page 10). These conventional subspace based methods require information on the number of signals that enter an array, since the signal subspace or noise subspace is acquired by the eigen value decomposition (EVD) of an array covariance matrix or the singular value decomposition (SVD) of an array data matrix. For this, estimating the number of incoming signals based on the receive data of an array is an absolute necessity of any incoming direction estimation method having high resolution, and is not limited to eigenvalue decomposition and singular value decomposition.

In the estimation of the number of incoming signals, an estimation method based on information theoretic criteria of AIC (Akaike Information Criterion) and MDL (Minimum Description Length), which uses the eigen value of an array covariance matrix obtained in eigenvalue decomposition or singular value decomposition, is well known (see Non-patent Document 4 listed on page 10). As a means of solving problems of estimating the number of multiple waves having complete correlation, an estimation method based on information theoretic criterion using spatial smoothing (SS) is also well known. Typical examples thereof are SS-AIC and SS-MDL (see Non-patent Document 2 and Non-patent Document 4).

In the case of the AIC and MDL methods, which estimate the number of uncorrelation signals, an array covariance matrix is determined based on the receive data of array antenna elements, the eigenvalue decomposition of the covariance matrix is performed, and the number of signals is estimated using the characteristic that the number of small eigen values is related to the number of signals. For the number of signals having correlation (including multiple waves having complete correlation), a uniform linear array is divided into sub-arrays to suppress the correlations among incoming signals, an averaging operation is performed on the covariance matrix of each sub-array, and the number of correlation signals is estimated using the characteristic that a number of small eigen values in the spatially averaged covariance matrix is related to the number of signals.

In order to show the shortcomings of the AIC and MDL methods, which are conventional methods for estimating the number of signals, the SS-AIC method and SS-MDL method for estimating the number of multiple waves, which are stated in Non-patent Document 2 and Non-patent Document 4, will be briefly described.

Here it is assumed that p number of multiplex wave narrowband signals $[s_k(n)]$ enter a uniform linear antenna which has M number of array elements at angle $[\theta_k]$. An array receive signal of each element is given by the following Expression (1).

$$y(n)=[y_1(n),y_2(n),\ldots,y_M(n)]^T=As(n)+w(n)\ A=[a(\theta_1),a(\theta_2),\ldots,a(\theta_p)],a(\theta_k)=[1,e^{j\omega_0\tau(\theta_k)},\ldots,e^{j\omega_0(M-1)\tau(\theta_k)}]^T,\ s(n)=[s_1(n),s_2(n),\ldots,s_p(n)]^T,$$
$$w(n)=[w_1(n),w_2(n),\ldots,w_M(n)]^T,\ \omega_0=2\pi f_0,\ \tau(\theta_k)=(d/c)\sin\theta_k \qquad (1)$$

where $f_0$, c and d are a frequency of the carrier wave, propagation velocity and array antenna element interval (half-wavelength) respectively. $(\bullet)^T$ indicates transposition, and $a(\theta_k)$ and A are an array response vector and response matrix respectively. $w_i(n)$ is an average zero or power $\sigma^2$ white Gaussian noise, which is independent for each element. In this case, the covariance matrix of the array is given by the following Expression (2).

$$R=E\{y(n)y^H(n)\}=AR_sA^H+\sigma^2 I_M \qquad (2)$$

$E\{\bullet\}$ and $(\bullet)^H$ indicate an expected computation and complex conjugate transposition respectively, $Rs=E[s(n)s^H(n)]$ is a covariance matrix of the multiplex waves that enter, and $I_M$ is a unit matrix M×M. The correlation $r_{ik}$ of the observed data $y_i(n)$ and $y_k(n)$ is defined as $r_{ik}=E\{y_i(n)y^*_k(n)\}$. Here the relationship $r_{ik}=r^*_{ki}$ is established. $(\bullet)^*$ indicates a complex conjugate. The covariance matrix R of the array in Expression (2) can be clearly expressed as following.

$$R=\begin{bmatrix} r_{11} & r_{12} & \ldots & r_{1M} \\ r_{21} & r_{22} & \ldots & r_{2M} \\ \ldots & \ldots & \ldots & \ldots \\ r_{M1} & r_{M2} & \ldots & r_{MM} \end{bmatrix} \qquad (3)$$

In order to estimate the incoming directions $\{\theta_k\}$ of multiple waves having complete correlation, spatial smoothing MUSIC divides the entire uniform linear array into L number of overlapped sub-arrays having m ($1 \leq m \leq M$) number of elements, as shown in FIG. 1. Here m and L are referred to as the "size of the sub-array" and the "number of sub-arrays", and L=M−m+1. Based on Expression (1), the receive vector of the l-th sub-array $y_l(n)$ can be expressed by Expression (4).

$$y_l(n)=[y_l(n),y_{l+1}(n),\ldots,y_{l+m-1}(n)]^T=A_m D^{l-1}s(n)+w_l$$
$$(n)A_m=[\alpha_m(\theta_1),\alpha_m(\theta_2),\ldots,\alpha_m(\theta_p),\alpha^m(\theta_k)=[1,e^{j\omega_0 6}(\theta_k),\ldots,e^{j\omega_0(m-1)\tau(\theta_k)}]^T,\ w_l(n)=[w_l(n),w_{l+1}(n),\ldots,w_{l-m+1}(n)]^T, \qquad (4)$$

D is a diagonal matrix of which elements are $\exp(j\omega_0\tau(\theta_1))$, $\exp(j\omega_0\tau(\theta_2)),\ldots,\exp(j\omega_0\tau(\theta_p))$, and l=1, 2, … L. $a_m(\theta_k)$ and $A_m$ are the response vector and response matrix of the sub-array. Therefore the covariance matrix of the l-th sub-array is given by Expression (5).

$$R_l = E\{y_l(n)y_l^H(n)\} = A_m D^{l-1} R_s (D^{l-1})^H A_m^H + \sigma^2 I_m \tag{5}$$

If the covariance matrix of L number of sub-arrays $\{R_l\}$ is spatially averaged, the covariance matrix shown in Expression (6) is obtained.

$$\overline{R} = \frac{1}{L}\sum_{l=1}^{L} R_l \tag{6}$$

The spatially averaged eigenvalue decomposition of the covariance matrix of the above expression can be expressed as the following Expression (7).

$$\overline{R} = \sum_{i=1}^{m} \lambda_i e_i e_i^H = E\Lambda E^H \tag{7}$$

Here $e_i$ and $\lambda_i$ are the eigen vector and eigen value of the matrix $\overline{R}$ respectively, E is a matrix of which column is $[e_i]$, and $\Lambda$ is a diagonal matrix of which elements are $[\lambda_i]$, $\lambda_1 \geq \lambda_2 \geq \ldots \geq \lambda_p > \lambda_{p+1} = \ldots = \lambda_m = \sigma^2$. Hence the number of incoming signals p (=m−a) can be estimated from the number of minimum eigen values a(=m−p). Because of this, a sample covariance matrix of each sub-array is determined by the following expression using the receive vectors $\{y(n)\}_{n=1}^{N}$ at sample time n=1, 2, ... N. Then Expression (5), where N=∞, can be expressed as the following Expression 8.

$$\hat{R}_l = \frac{1}{N}\sum_{n=1}^{N} y_l(n)y_l^H(n) \tag{8}$$

The eigen value decomposition of a spatially averaged sample covariance matrix $\hat{R}_l$ can be calculated as the following Expression (9).

$$\hat{R} = \frac{1}{L}\sum_{l=1}^{L} \hat{R}_l = \sum_{i=1}^{m} \hat{\lambda}_i \hat{e}_i \hat{e}_i^H \tag{9}$$

If the number of signals is estimated using an estimated value of the eigen value $\{\hat{\lambda}_i\}$, the AIC and MDL standards are given by the following expressions.

$$AIC(k) = -N(m-k)\log\left\{\frac{\left(\prod_{i=k+1}^{m}\hat{\lambda}_i\right)^{1/(m-k)}}{\frac{1}{m-k}\sum_{i=k+1}^{m}\hat{\lambda}_i}\right\} + k(2m-k) \tag{10a}$$

$$MDL(k) = -N(m-k)\log\left\{\frac{\left(\prod_{i=k+1}^{m}\hat{\lambda}_i\right)^{1/(m-k)}}{\frac{1}{m-k}\sum_{i=k+1}^{m}\hat{\lambda}_i}\right\} + 0.5k(2m-k)\log N \tag{10b}$$

Therefore the number of signals can be determined by an integer k, which minimizes AIC (k) or MDL (k). In other words, the number of signals is k, which satisfies the following Expression (11).

$$\hat{p} = \underset{k}{\operatorname{argmin}}\, AIC(k) \tag{11a}$$

$$\hat{p} = \underset{k}{\operatorname{argmin}}\, MDL(k) \tag{11b}$$

Here k=1, 2, ... m.

As Expression (9) shows, the AIC or the MDL method for estimating the number of incoming signals requires the eigenvalue decomposition of the spatially averaged array covariance matrix $$\hat{\overline{R}}$$

in order to obtain the eigen value $\{\hat{\lambda}_i\}$.

With a conventional AIC or MDL method, however, eigenvalue decomposition processing and singular value decomposition processing, which are essential, become complicated, and the calculation volume becomes enormous when the number of array elements is large, or when a changing incoming direction is estimated in real-time processing, and the calculation time becomes very long. Hence the actual application of the incoming signal number estimation method, based on conventional eigenvalue decomposition, is limited by the eigenvalue decomposition which causes a burden on calculation, and the number and the incoming directions of signals that enter the array cannot be estimated at high-speed and at high accuracy.

Moreover, in the case of a conventional AIC or MDL method, a number and incoming direction of signals that enter an array cannot be estimated at high accuracy if the receive data length of an array antenna is short, or if the signal-to-noise ratio (SNR) is low.

If the incoming direction of the signal cannot be accurately estimated, the base station cannot form the receive/transmission beam accurately, and performance of the receive and transmission system of the base station deteriorates.

SUMMARY OF THE INVENTION

With the foregoing in view, it is an object of the present invention to provide a method for accurately estimating the number of incoming signals with a small computation volume, without using eigenvalue decomposition, for narrowband signals which enter a uniform linear array (ULA) in a spatially/timely uncorrelated white noise environment, or in a spatially correlated noise environment. The target narrowband signal is, for example, uncorrelated, or correlated, or completely correlated (that is multiple wave), or a partially correlated, or a partially complete correlated narrowband signal.

It is another object of the present invention to provide a method for accurately estimating the number of incoming signals with a small computation volume without using eigenvalue decomposition, even if the receive data length of the array antenna is short, or even if the signal-to-noise ratio (SNR) is low.

It is still another object of the present invention to provide a method for accurately estimating the number of incoming signals at high detection probability even if a plurality of signals, of which angles are spatially similar, enter.

Non-Patent Document:

Non-patent Document 1: R. O. Schmidt, "Multiple emitter location and signal parameter estimation", IEEE Trans. Antenna Propagation, Vol. 34, No. 3, pp. 276-280 (1986) Non-patent Document 2: J. Shan, M. Wax and T. Kailath, "On spatial smoothing for direction-of-arrival estimation of coherent signals", IEEE Trans. Acoust., Speech, Signal Processing, Vol. 33, No. 4, pp. 806-811 (1985) Non-patent Document 3: S. U. Pillai and B. H. Kwon, "Forward/backward spatial smoothing techniques for coherent signals identification", IEEE Trans. Acoust., Speech, Signal, Vol. 37, No. 1, pp. 8-15 (1989) Non-patent Document 4: Wax and T. Kailath, "Detection of signals by information theoretic criteria", IEEE Trans. Acoust. Speech, Signal Processing, Vol. 33, No. 2, pp. 387-392 (1985)

According to the present invention, the above mentioned problem is solved by an incoming wave number estimation method, incoming wave number estimation device, and radio device for receiving incoming radio waves by an array antenna in which a plurality (=M) of antenna elements are linearly arrayed with a same element spacing, and estimating the number of the incoming radio waves.

The incoming wave number estimation method of the present invention comprises: a step of calculating correlations between a receive signal of each antenna element and receive signals of all antenna elements of the array antenna; a step of removing a diagonal element from a predetermined row and column constituting an M×M array covariance matrix, where said correlations between a receive signal of each antenna element and receive signals of all the antenna element are arrayed in a matrix, and creating a correlation matrix by extracting a predetermined $\bar{p}$ number of correlations from (M−1) number of correlations after said diagonal element is removed while sequentially shifting one element at a time, and arraying the $\bar{p}$ number of correlations in a matrix; a step of creating an estimation matrix for estimating the incoming wave number using the correlation matrix; and a step of estimating the number of incoming radio waves based on each row element of an upper triangular matrix factor obtained by performing QR decomposition on the estimation matrix.

In the step of creating a correlation matrix, when q ($0 \leq q \leq M-1$) is a length of the spatial correlation of a noise, a diagonal element and q number of adjacent elements which are chained to the diagonal element, are removed from a predetermined row or column constituting the array covariance matrix, and the correlation matrix is created by extracting a predetermined $\bar{p}$ number of correlations from (M−q−1) number of correlations after (q+1) number of elements are removed while sequentially shifting one element at a time, and arraying the $\bar{p}$ number of correlations in a matrix.

An incoming wave number estimation device of the present invention, comprises: a correlation computation section for calculating correlations between a receive signal of each antenna element and receive signals of all antenna elements of the array antenna; a correlation matrix creation section for removing a diagonal element from a predetermined row or column constituting an M×M array covariance matrix, where said correlations between a receive signal of each antenna element and receive signals of all the antenna elements are arrayed in a matrix, and creating a correlation matrix by extracting a predetermined $\bar{p}$ number of correlations from (M−1) number of correlations after said diagonal element is removed while sequentially shifting one element at a time, and arraying the $\bar{p}$ number of correlations in a matrix; an estimation matrix creation section for creating an estimation matrix for estimating the incoming wave number using the correlation matrix; a QR decomposition section for performing QR composition on the estimation matrix; and an incoming wave number determination section for determining the number of incoming radio waves based on each row element of an upper triangular matrix factor obtained by QR decomposition.

When q ($0 \leq q \leq M-1$) is a length of the spatial correlation of a noise, the correlation matrix creation section removes a diagonal element and q number of adjacent elements which are chained to the diagonal element from a predetermined row or column constituting the array covariance matrix, and creates the correlation matrix by extracting a predetermined $\bar{p}$ number of corrections from (M−q−1) number of correlations after (q+1) number of elements are removed while sequentially shifting one element at a time, and arraying the $\bar{p}$ number of correlations in a matrix.

The correlation matrix creation section creates the correlation matrix for one or more of first row, last row, first column and last column of the array covariance matrix, and the estimation matrix creation section creates the estimation matrix by arraying the created correlation matrices.

The incoming wave number determination section comprises a calculation section for calculating a ratio of a total sum of an absolute value of each matrix element in a i-th row and a total sum of an absolute value of each matrix element in a (i+1)th row of the upper triangular matrix factor, and a determination section for determining i with which the ratio is the minimum as the number of incoming radio waves.

A radio device of the present invention comprises: an incoming wave number estimation section for estimating the number of incoming radio waves; an incoming direction estimation section for estimating an incoming direction of a signal using receive data for each antenna element and the number of incoming radio waves; and a receive beam former for performing receive beam forming processing using the estimation value of the incoming direction so as to have a peak in a signal source direction, wherein the incoming wave number estimation section comprises: a correlation computation section for calculating correlations between a receive signal of each antenna element and receive signals of all antenna elements of the array antenna; a correlation matrix creation section for removing a diagonal element from a predetermined row or column constituting an M×M array covariance matrix, where said correlations between a receive signal of each antenna element and receive signals of all the antenna elements are arrayed in a matrix, and creating a correlation matrix by extracting a predetermined $\bar{p}$ number of correlations from (M−1) number of correlations after said diagonal element is removed while sequentially shifting one element at a time, and arraying the $\bar{p}$ number of correlations in a matrix; an estimation matrix creation section for creating an estimation matrix for estimating the incoming wave number using the correlation matrix; a QR decomposition section for performing QR decomposition on the estimation matrix; and an incoming wave number determination section for determining the number of incoming radio waves based on each row element of an upper triangular matrix factor obtained by the QR decomposition.

DESCRIPTION OF THE PREFERRED EMBODIMENTS (A) First Embodiment

The present invention relates to an incoming radio wave number estimation method and estimation device in a base station for estimating the radio wave incoming direction using an array antenna, and the incoming radio wave number estimation method and estimation device of the first embodiment will be described in reference to the drawings. In the following drawings, elements that are roughly the same or have a same function are denoted with a same reference symbol.

Figure 1:
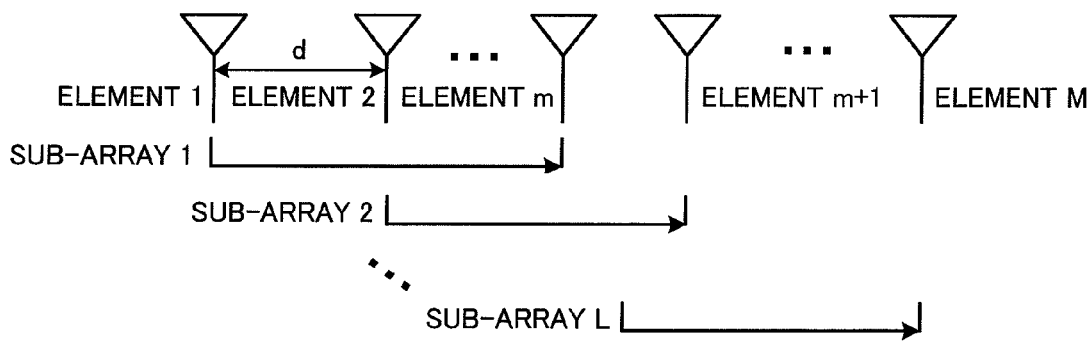
FIG. 1 is a diagram depicting a general sub-array in a uniform linear array.
Figure 2:
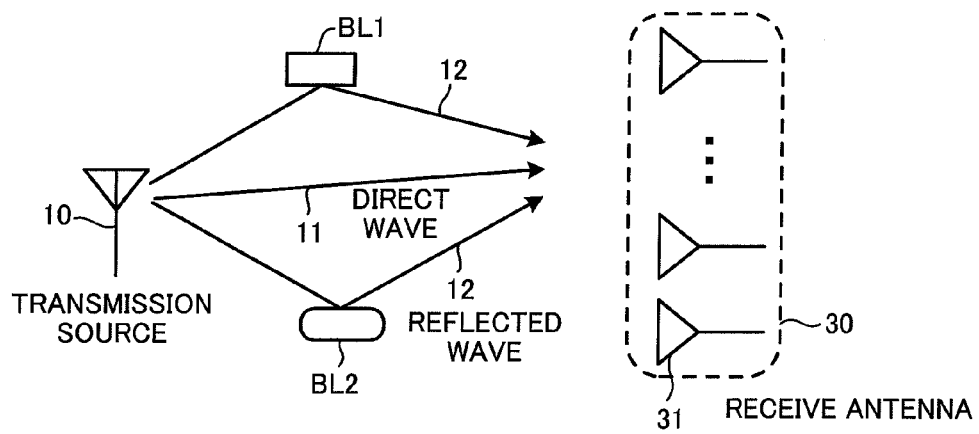
FIG. 2 is a diagram depicting an arrangement of a transmission source and a base station receive antenna.

FIG. 1 is a diagram depicting a configuration of an array antenna in which M number of antenna elements are linearly arrayed with a spacing of distance d. FIG. 2 is a diagram depicting a positional relationship of a transmission source 10 and a base station receive antenna (array antenna) 30. As FIG. 1 shows, the array antenna 30 has a configuration of a uniform linear array antenna, and constitutes a multiple wave incoming direction estimation system. In FIG. 2, a direct wave 11 enters directly from the transmission source 10 to the array antenna 30, and reflected waves 12 enter the array antenna 30 after being reflected by buildings BL1 and BL2. FIG. 2 shows two reflected waves as an example, but a total number of direct wave and reflected waves from the transmission source 10 is p (actually an unknown quantity). In addition, M>2p. The relationship of the direct wave and the reflected wave is given by the following Expression (12).

$$s_k(n) = \beta_k s_1(n) \tag{12}$$

$\beta_k$ is a multi-path coefficient to indicate the complex attenuation of the reflected wave $s_k(n)$ with respect to the direct wave $s_1(n)$. Here $\beta_k \neq 0$ and $\beta_1 = 1$.

Figure 3:
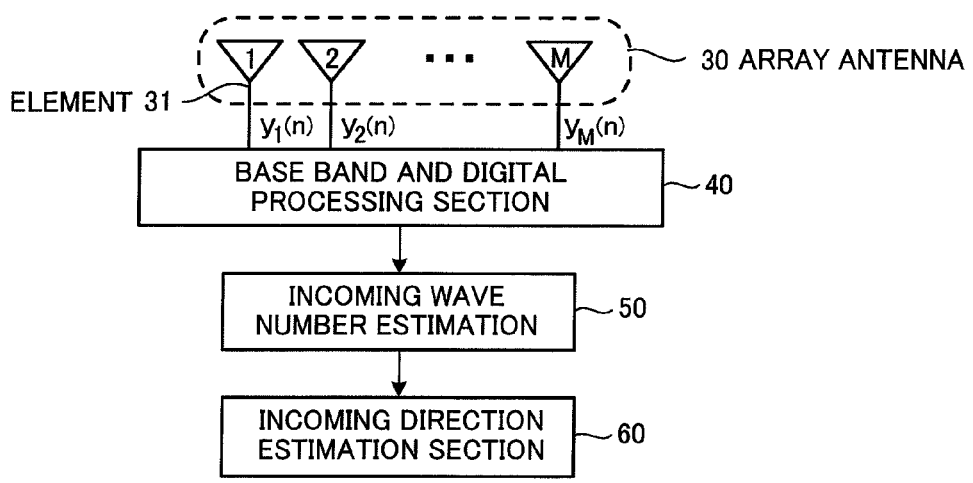
FIG. 3 is a block diagram depicting key sections of a radio device of the present invention.

FIG. 3 is a block diagram depicting a multiple wave incoming direction estimation system. The incoming direction estimation system comprises an array antenna 30, a base band and digital processing section 40, an incoming wave number estimation section 50 for estimating the number of incoming waves, and an incoming direction estimation section 60. The array antenna 30 is comprised of M number of antenna elements 31 (M>2p).

Figure 4:
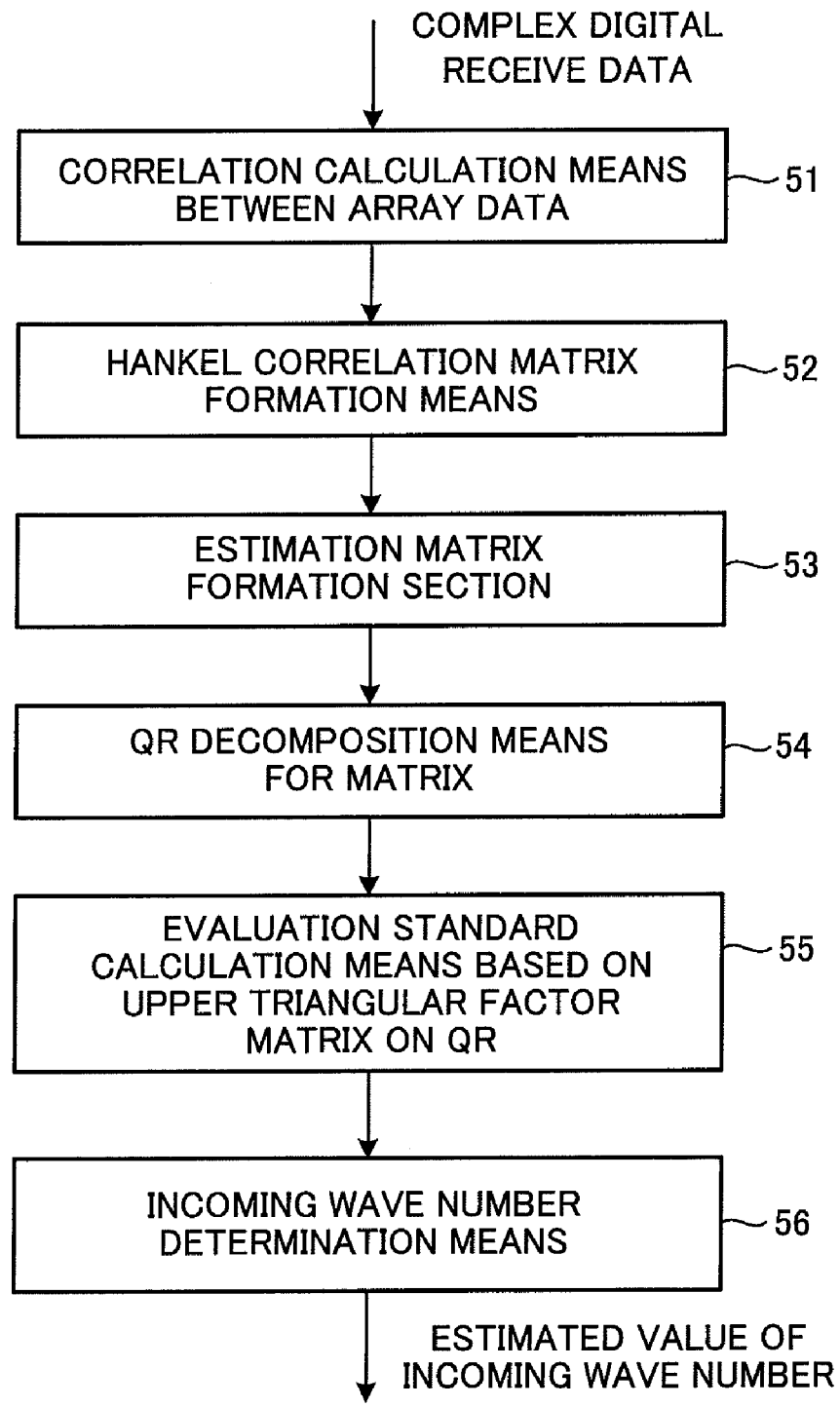
FIG. 4 is a block diagram depicting an operation of an incoming wave number estimation section of the present invention.

FIG. 4 is a diagram depicting a configuration of the incoming wave number estimation section 50. The incoming wave number estimation section 50 comprises a correlation calculation means 51 for calculating the correlation between array data, a Hankel correlation matrix formation section 52, an estimation matrix formation means 53 that creates an estimation matrix for estimating the number of incoming radio waves, a QR decomposition means 54 for performing QR decomposition on the estimation matrix, an evaluation standard calculation means 55 for calculating an evaluation standard by an upper triangular matrix factor obtained by QR decomposition, and incoming wave number determination means 56 for determining an incoming wave number.

Generally, when a radio wave incoming direction is estimated based on the signal received from the array antenna 30, an array covariance matrix R, in which correlations $r_{11}$ to $r_{MM}$ between each receive signal of an antenna element receive signal vector $y(n)$ ($=[y_1(n), y_2(n), \ldots, y_M(n)]^T$) are computed and arrayed in a matrix, is used. If a complex conjugate of the receive signal vector $y(n)$ is $y^H(n)$, this array covariance matrix R is given by the following Expression (13) in an uncorrelated white noise environment.

$$R = E\{y(n)y^H(n)\} \tag{13}$$

$$= \begin{bmatrix} r_{11} & r_{12} & \cdots & r_{1M} \\ r_{21} & r_{22} & \cdots & r_{2M} \\ \cdots & \cdots & \cdots & \cdots \\ r_{M1} & r_{M2} & \cdots & r_{MM} \end{bmatrix}$$

$$= \begin{bmatrix} \bar{r}^0_{11} & \bar{r}^0_{12} & \cdots & \bar{r}^0_{1M} \\ \bar{r}^0_{21} & \bar{r}^0_{22} & \cdots & \bar{r}^0_{2M} \\ \cdots & \cdots & \cdots & \cdots \\ \bar{r}^0_{M1} & \bar{r}^0_{M2} & \cdots & \bar{r}^0_{MM} \end{bmatrix} + \begin{bmatrix} \sigma^2 & 0 & \cdots & 0 \\ 0 & \sigma^2 & \cdots & 0 \\ \cdots & \cdots & \cdots & \cdots \\ 0 & 0 & \cdots & \sigma^2 \end{bmatrix}$$

If $x_i(n)$ is a non-noise receive signal and $w_j(n)$ is an uncorrelated white noise, then $y_i(n) = x_i(n) + w_i(n)$ $E[w_i(n)w_j^*(n)] = \sigma^2$ (i=j)

$E[w_i(n)w_j^*(n)] = 0$ (I≠j)

In other words, in an uncorrelated white noise environment, noise is included in diagonal elements $r_{11}, r_{22}, \ldots r_{MM}$ of the array covariance matrix R.

Figure 5:
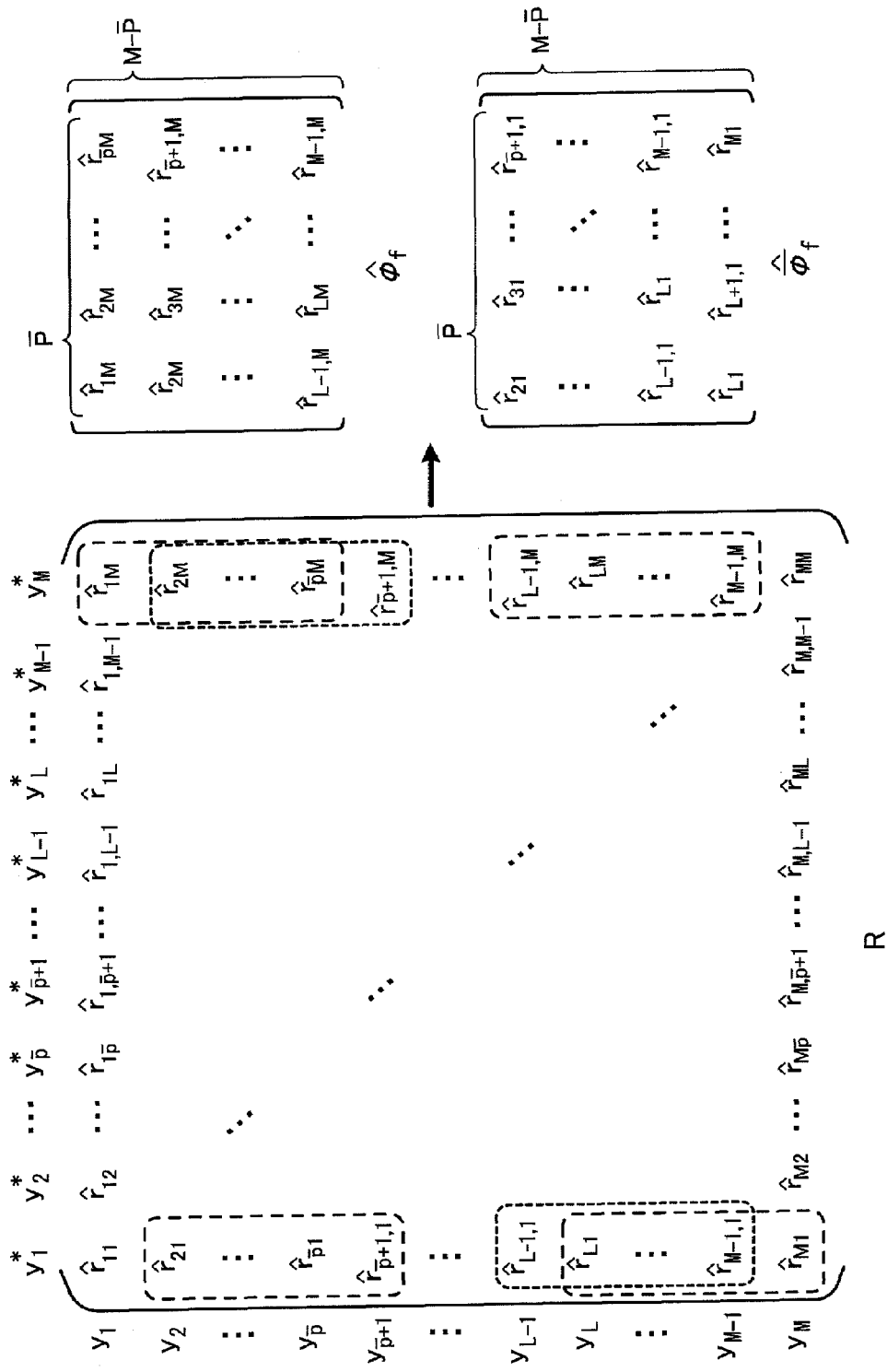
FIG. 5 is a diagram depicting column elements required for incoming wave number estimation of radio waves in an array covariance matrix and Hankel matrix.
Figure 6:
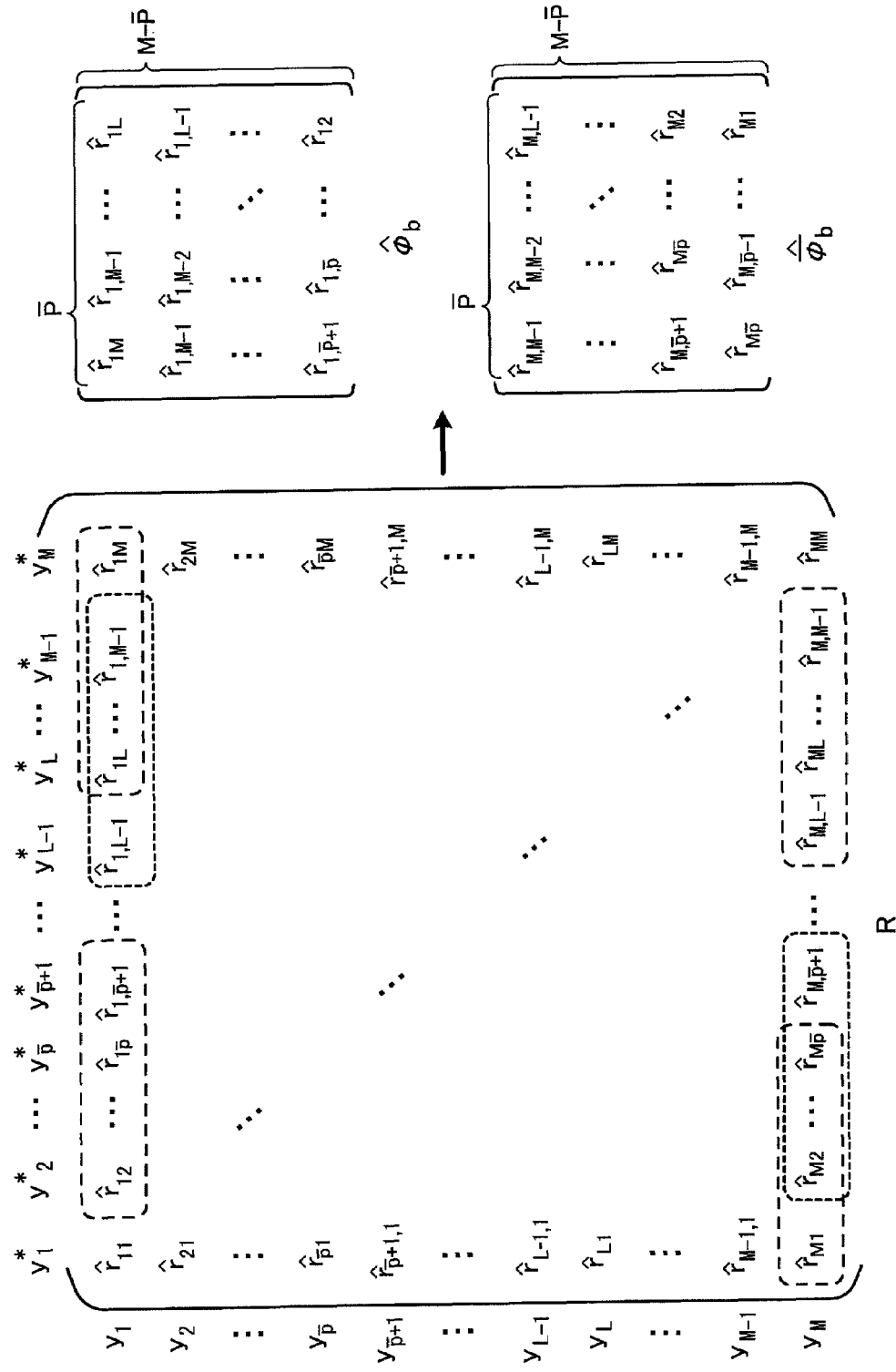
FIG. 6 is a diagram depicting row elements required for incoming wave number estimation of radio waves in an array covariance matrix and Hankel matrix.

Since the array covariance matrix R has conjugate symmetry, it is sufficient to calculate arbitrary rows and columns, such as the first column and last column, as shown in FIG. 5, or the first row and the last row, as shown in FIG. 6, when the incoming wave number or incoming direction is estimated. However, diagonal elements include noise, as mentioned above, so diagonal elements $r_{11}$ and $r_{MM}$ are removed from each of the first and last columns and each of the first and last rows, as shown in FIG. 5 and FIG. 6.

Now an incoming wave number estimation procedure in the incoming wave number estimation section 50 will be described. First the correlation calculation means 51, to calculate the correlation between array data, creates a receive vector y(n), as shown in Expression (1), using the complex digital signals $y_1(n), y_2(n), \ldots, y_M(n)$, obtained from the base band and digital processing section 40. Then using a receive vector $\{y(n)\}_{n=1}^{N}$ at sample time n=1, 2, ..., N, correlation vectors between signal y(n) and $y^*_M(n)$, and between y(n) and $y^*_1(n)$ are determined by the following Expressions (14a) and (14b).

$$\hat{\varphi} = [\hat{r}_{1M}, \hat{r}_{2M}, \ldots, \hat{r}_{MM}]^T = \frac{1}{N}\sum_{n=1}^{N} y(n)y^*_M(n) \quad (14a)$$

$$\hat{\bar{\varphi}} = [\hat{r}_{11}, \hat{r}_{21}, \ldots, \hat{r}_{M1}]^T = \frac{1}{N}\sum_{n=1}^{N} y(n)y^*_1(n) \quad (14b)$$

Then using the correlation values obtained by Expressions (14a) and (14b), the Hankel correlation matrix formation section 52 creates $$\hat{\Phi}_f, \hat{\bar{\Phi}}_f, \hat{\Phi}_b, \hat{\bar{\Phi}}_b \quad (A)$$

which are Hankel correlation matrixs of $(M-\bar{p}) \times \bar{p}$. In other words, the correlation calculation means 51 calculates the (M−1) number of correlations $\hat{r}_{1M}, \hat{r}_{2M}, \ldots, \hat{r}_{M-1,M}$ (see last column in FIG. 5), between the receive signal of the Mth antenna element and the receive signals of the first, second, ... (M−1)th antenna elements in the array antenna. Here M is the number of elements of the array antenna, L is the number of sub-arrays, and $\bar{p}$ is a size of a sub-array (that is, number of elements of the sub-array), which is a maximum integer that is not greater than M/2. In other words, $L=M-\bar{p}+1$ $\bar{p}=[M/2]$ Then as shown at the upper right in FIG. 5, the Hankel correlation matrix creation section 52 extracts $\bar{p}$ number of correlations (size of the sub-array) from the (M−1) number of correlations of the last row, and extracts $(M-\bar{p})$ sets of correlations while sequentially shifting one element at a time from the top to the bottom direction, and creates a correlation matrix $\hat{\Phi}_f$ of $(M-\bar{p})$ rows×$\bar{p}$ columns, where the correlation of each extracted set is sequentially arrayed in a matrix from the first row.

In the same manner, the correlation calculation means 51 calculates (M−1) number of correlations between the receive signal of the first antenna element and receive signals of the second, third, ... Mth antenna elements in the array antenna, that is $\hat{r}_{21}, \hat{r}_{31}, \ldots, \hat{r}_{M1}$ (see the first column in FIG. 5). Then the Hankel correlation matrix formation section 52 extracts $\bar{p}$ number of correlations (size of the sub-array) from the (M−1) number of correlations of the first column, as shown at the lower right in FIG. 5, and extracts $(M-\bar{p})$ sets of correlations, while sequentially shifting one element at a time from the top to the bottom direction, and creates a correlation matrix $$\hat{\bar{\Phi}}_f$$

of $(M-\bar{p})$ rows×$\bar{p}$ columns, where a correlation matrix of each extracted set is sequentially arrayed in a matrix from the first row.

Then a similar operation is also performed for rows. In other words, the correlation calculation means 51 calculates (M−1) number of correlations between the receive signal of the first antenna element and receive signals of the second, third, ... Mth antenna elements in the array antenna, that is $\hat{r}_{12}, \hat{r}_{13}, \ldots, \hat{r}_{1,M}$ (see the first row in FIG. 6). Then the Hankel correlation matrix formation section 52 extracts $\bar{p}$ number of correlations (size of the sub-array) from the (M−1) number of correlations of the first row, as shown at the upper right in FIG. 6, and extracts $(M-\bar{p})$ sets of correlations, while sequentially shifting one element at a time from the right to left, and creates a correction matrix $\hat{\Phi}_b$ of $(M-\bar{p})$ rows×$\bar{p}$ columns where the correlation matrix of each extracted set is sequentially arrayed in a matrix from the first row.

In the same manner, the correlation calculation means 51 calculates (M−1) number of correlations between the receive signal of the Mth antenna element and receive signals of the first, second, ..., (M−1)th antenna elements in the array antenna, that is, $\hat{r}_{M1}, \hat{r}_{M2}, \ldots, \hat{r}_{M,M-1}$ (see the last row in FIG. 6). Then the Hankel correlation matrix formation section 52 extracts $\bar{p}$ number of correlations (size of the sub-array) from the (M−1) number of correlations of the last row, as shown at the lower right in FIG. 6, and extracts $(M-\bar{p})$ sets of correlations, while sequentially shifting one element at a time from the right to the left, and creates a correlation matrix $$\hat{\bar{\Phi}}_b$$

of the $(M-\bar{p})$ rows×$\bar{p}$ columns, where the correlation matrix of each extracted set is sequentially arrayed in a matrix from the first row.

When the above mentioned four Hankel correlation matrices are determined, the estimation matrix creation section 53 creates an estimation matrix by the following Expression (15).

$$\hat{\Phi} = \left[\hat{\Phi}_f, \hat{\bar{\Phi}}_f, \hat{\Phi}_b, \hat{\bar{\Phi}}_b\right] \quad (15)$$

This estimation matrix is a matrix of $(M-\bar{p})$ rows×$4\bar{p}$ columns. As Expression (14a) and (14b) show, it is clear that each of the four Hankel correlation matrices shown in (A) are not influenced by noise if the data length N is sufficiently long. Also, the following relationship in Expression (16)

$\Phi_b = J_{L-1}\bar{\Phi}_f^* J_p$ $\bar{\Phi}_b = J_{L-1}\Phi_f^* J_p \quad (16)$ is established, and the array covariance matrix R has conjugate symmetry, so it is not necessary to use all four correlation matrices, as does the present embodiment, but an estimation matrix can be created by one or more arbitrary combinations. Embodiments using other combinations will be described later. Here $J_m$ is an m×m inverted matrix.

Then the QR decomposition means 54 of the matrix determines the correlation matrix $\hat{\Psi}$ of the estimation matrix $\hat{\Phi}$ in Expression (15), and performs QR decomposition using the following Expression (17).

$$\hat{\Psi} = \hat{\Phi}\hat{\Phi}^H = \hat{\underline{Q}}\hat{\underline{R}} \tag{17}$$

QR decomposition is a method for decreasing calculation amount (see G. H. Golub and C. F. Van Loan, Matrix Computations, Second Edition, Baltimore, Md., The Johns Hopkins University Press, 1989), and the QR decomposition of m×n matrix A (m>n, rank (A)=n) is given by the expression A=QR, where Q is the orthogonal matrix of m×m, and $\underline{R}$ is the upper triangular matrix m×n. Here an orthogonal matrix is a matrix in which the total of products of the corresponding elements in an arbitrary two rows become 0, and an upper triangular matrix is a matrix in which all of the matrix elements below the diagonal line become 0. Therefore in Expression (17), $$\hat{\underline{Q}}, \hat{\underline{R}}$$

are a unitary matrix (orthogonal matrix) and an upper triangular matrix of $(M-\bar{p})$ rows×$(M-\bar{p})$ columns respectively, and each element of the upper triangular matrix takes the following values.

$$\hat{r}_{ik} \neq 0 \text{ for } i \leq k \text{ and } i = 1, 2, \ldots, M-\bar{p} \tag{18}$$
$$\hat{r}_{ik} = 0 \text{ for others}$$

When QR decomposition is performed, the rank of the upper triangular matrix $$\hat{\underline{R}}$$

in Expression (17) becomes the number of incoming waves, that is p, if the length N of the receive data is sufficiently long. Therefore if there is no noise, or if the length N of the receive data is ideally long, the elements of $(M-\bar{p}-p)$ number of the rows from the bottom of the upper triangular matrix become 0.

Then the evaluation standard calculation means 55 calculates the auxiliary amount $\zeta(i)$ by the following Expression (19)

$$\zeta(i) = \sum_{k=i}^{M-\bar{p}} |\hat{r}_{ik}| \tag{19}$$

using the elements of the i-th row of the QR upper triangular matrix factor. In the above mentioned ideal state, $(M-\bar{p}-p)$ number of the auxiliary amount $\zeta(i)$ becomes 0, so all rows where $\zeta(i)=0$ establishes are found and the number of incoming waves p can be computed from the number of the rows. However if noise exists, $\zeta(i)=0$ is not precisely established, so the following processing is performed. In other words, the incoming wave number determination means 56 calculates the evaluation standard $\xi(i)$ by the following Expression (20).

$$\xi(i) = \frac{\zeta(i)}{\zeta(i+1)} \tag{20}$$

Here i=1, 2, ..., $M-\bar{p}-1$, and i, which makes the evaluation standard $\xi(i)$ the maximum is considered as the number of incoming wave $\hat{p}$. That is, $$\hat{p} = \underset{i}{\operatorname{argmax}} \xi(i) \tag{21}$$

As described above, the incoming wave number estimation means 50 can estimate the number of incoming signals of the complete correlation signals (multiplex waves), or partial correlation signals or uncorrelation signals in a timely and spatially uncorrelated white noise environment.

Now this will be further described using a concrete example of a computer simulation. In this simulation, it is assumed that the number of antenna elements M is 10, and that two multiple waves (p=2), having the same power, enter the array antenna at incoming directions $\theta_1=5°$ and $\theta_2=12°$.

Figure 7:
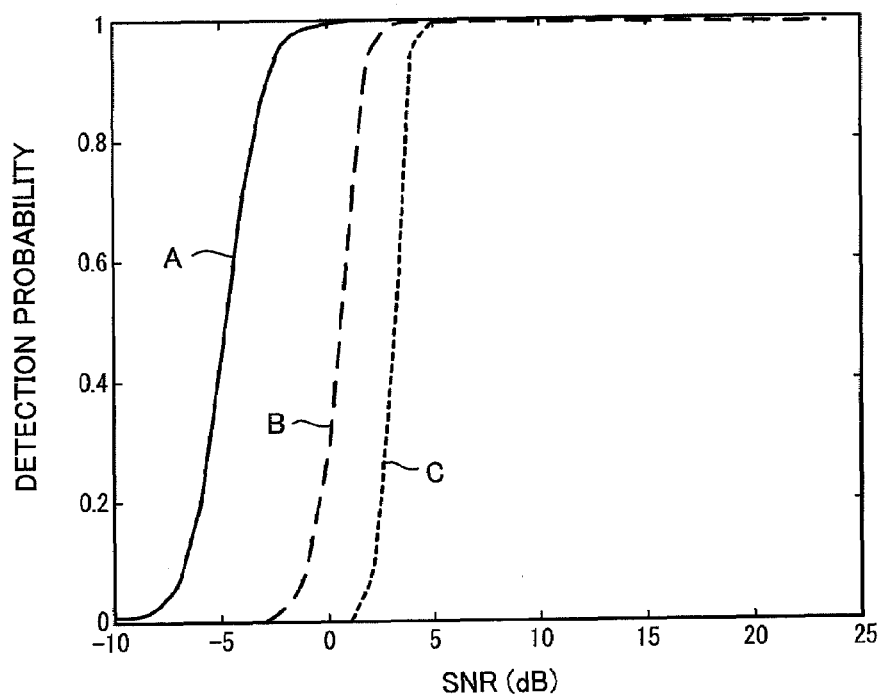
FIG. 7 is a characteristic diagram depicting a probability (detection probability) to accurately detect the number of incoming waves when SNR is changed.

First the multiple wave incoming wave number estimation performance according to the present invention is considered with respect to the signal-to-noise (SNR) ratio. In this case, the length N of the receive data is 128, and the SNR is changed in a range of −10 to 25 dB. For each SNR, calculation is performed 1000 times. Curve A in FIG. 7 is a characteristic diagram depicting a probability (detection probability) of the present invention when the incoming wave number is accurately detected, where the abscissa is the SNR (dB) and the ordinate is the detection probability. For comparison, the results, when a conventional SS-AIC (curve B) and SS-MDL (curve C) are used, are plotted.

As FIG. 7 shows, according to the incoming wave number estimation method of the present invention, the influence of observation noise can be removed by appropriately selecting the correlation $\hat{r}_{ik}$ of the array data constituting the correlation matrix $$\hat{\Phi}_f, \hat{\bar{\Phi}}_f, \hat{\Phi}_b, \hat{\bar{\Phi}}_b,$$

so the detection performance of the method of the present invention is much better than the SS-AIC and SS-MDL methods which use eigenvalue decomposition. The computation volume of the method of the present invention is quite low, since eigenvalue decomposition processing is unnecessary.

Figure 8:
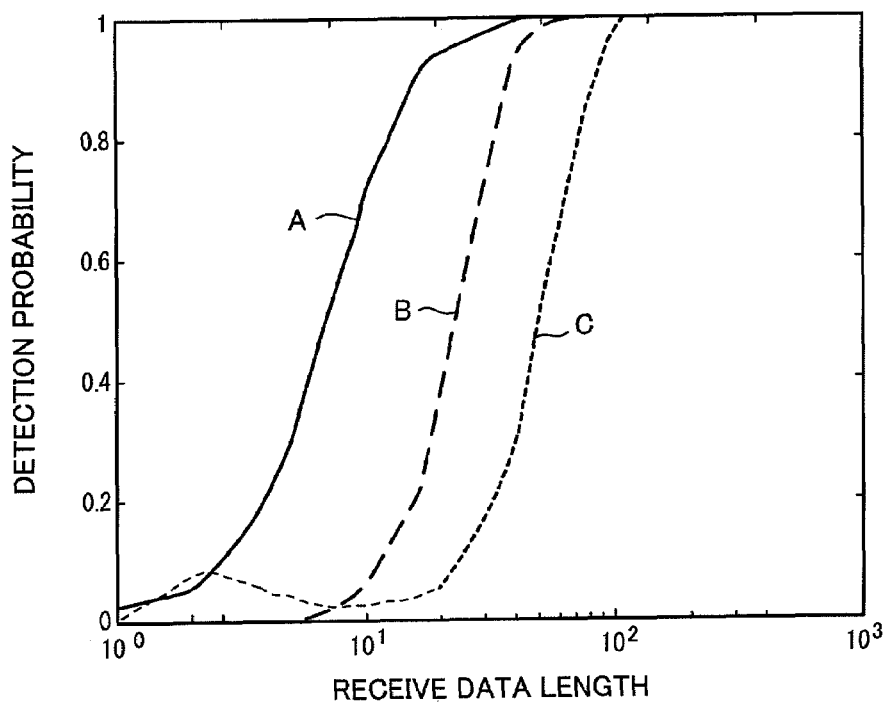
FIG. 8 is a characteristic diagram depicting a probability (detection probability) to accurately detect the number of incoming waves when the receive data length is changed.

Now multiple wave incoming direction estimation performance, based on the present invention with respect to the length N of the receive data, is shown. Here the SNR is 5 dB, and the length N of the receive data is changed in the range of 10 to 1000. Curve A in FIG. 8 shows the detection probability of the wave number estimation obtained by 1000 times of simulation calculations according to the present invention. As FIG. 8 shows, the method of the present invention shows a higher detection probability than the conventional SS-AIC (curve B) and SS-MDL (curve C) even if the receive data is small.

Figure 9:
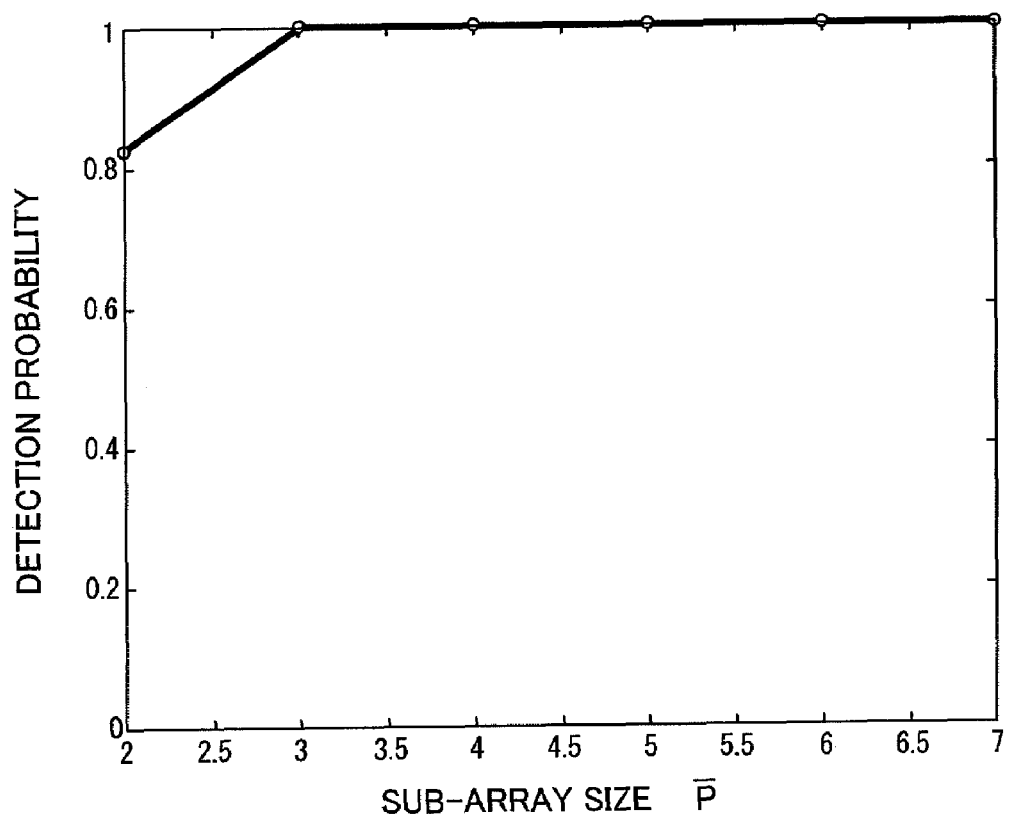
FIG. 9 is a characteristic diagram depicting a probability (detection probability) to accurately detect the number of incoming waves when the sub-array size is changed.

FIG. 9 is a simulation result to indicate the performance of multiple wave number estimation, and shows the probability (detection probability) of detecting an incoming wave number correctly. In FIG. 9, the abscissa is the sub-array size $\bar{p}$, and the ordinate is the probability to detect an incoming wave number correctly. Here the number of antenna elements M=10, the receive data length N=128, the SNR=5 dB, the sub-array size is changed in the range of 2 to 7, and the probability to detecting an incoming wave number accurately when 1000 times of calculation is performed for each sub-array size. The actual incoming wave number is 2. As FIG. 9 shows, the incoming wave number can be accurately detected if the number is estimated, assuming $\bar{p}=[M/2]$.

(B) Second Embodiment

In the first embodiment, the incoming wave number estimation method was described by creating the estimation matrix by $$\hat{\Phi} = \left[\hat{\Phi}_f, \hat{\bar{\Phi}}_f, \hat{\Phi}_b, \hat{\bar{\Phi}}_b\right],$$

but the incoming number of signals can be estimated for a complete correlation signal, that has multiple waves, or a partial correlation signal, or an uncorrelation signal, in an uncorrelated white noise environment by creating an estimation matrix $\hat{\Phi}$ using an arbitrary combination of the Hankel correlation matrix $$\hat{\Phi}_f, \hat{\bar{\Phi}}_f, \hat{\Phi}_b, \hat{\bar{\Phi}}_b \quad (A)$$

as described in connection with Expression (16).

(a) Example of Using an Arbitrary One Set

Out of the four sets of correlation matrices in (A), one arbitrary matrix is selected, and an estimated matrix is created. In other words, an estimation matrix is created by one of the following expressions, $$\hat{\Phi} = \hat{\Phi}_f, \hat{\Phi} = \hat{\bar{\Phi}}_f, \hat{\Phi} = \hat{\Phi}_b, \hat{\Phi} = \hat{\bar{\Phi}}_b \quad (22)$$

and thereafter, the incoming wave number is estimated by the same method as the first embodiment.

(b) Example of Using Two Arbitrary Sets of Correlation Matrices

Out of the four sets of correlation matrices in (A), two arbitrary correlation matrices are selected, and an estimation matrix is created. For example, an estimation matrix is created by one of the following expressions, $$\hat{\Phi} = \left[\hat{\Phi}_f, \hat{\bar{\Phi}}_f\right], \hat{\Phi} = \left[\hat{\Phi}_b, \hat{\bar{\Phi}}_b\right] \quad (23)$$

and the incoming wave number is estimated by the same method as the first embodiment.

(c) Example of Using Three Arbitrary Sets of Correlation Matrices

Out of the four sets of correlation matrices in (A), three arbitrary correlation matrices are selected, and an estimation matrix is created. For example, an estimation matrix is created by one of the following expressions, $$\hat{\Phi} = \left[\hat{\Phi}_f, \hat{\bar{\Phi}}_f, \hat{\Phi}_b\right], \hat{\Phi} = \left[\hat{\Phi}_f, \hat{\Phi}_b, \hat{\bar{\Phi}}_b\right] \quad (24)$$

and the incoming wave number is estimated by the same method as the first embodiment.

(C) Third Embodiment

The first and second embodiments are embodiments to estimate the incoming radio wave number in an uncorrelated white noise environment, where the correlations of the noise $w_i(n)$ and $w_j(n)$, included in the receive signals of the i-th antenna receive element and the j-th antenna receive element, are expressed by the following expressions.

$$E[w_i(n)w_j^*(n)] = \sigma^2 \; (i=j)$$

$$E[w_i(n)w_j^*(n)] = 0 \; (i \neq j)$$

In other words, this is the case when the length of the spatial correlation of noise is 1. The third embodiment is the case when the length of the spatial correlation of noise is q (>1). If the length of the spatial correlation of the noise is q, the correlation of the noise $w_i(n)$ and $w_j(n)$, included in the receive signals of the i-th antenna receive element and the j-th antenna receive element, is expressed by the following expressions.

$$E[w_i(n)w_j^*(n)] \neq 0 \; (|i-j| \leq q)$$

$$E[w_i(n)w_j^*(n)] = 0 \; (|i-j| > q)$$

In other words, if the length of the spatial correlation of the noise is q, noise is included in the diagonal elements $r_{11}$, $r_{22}$, . . . , $r_{MM}$ of the array covariance matrix R and the correlation elements at a distance q from these diagonal elements.

Figure 10:
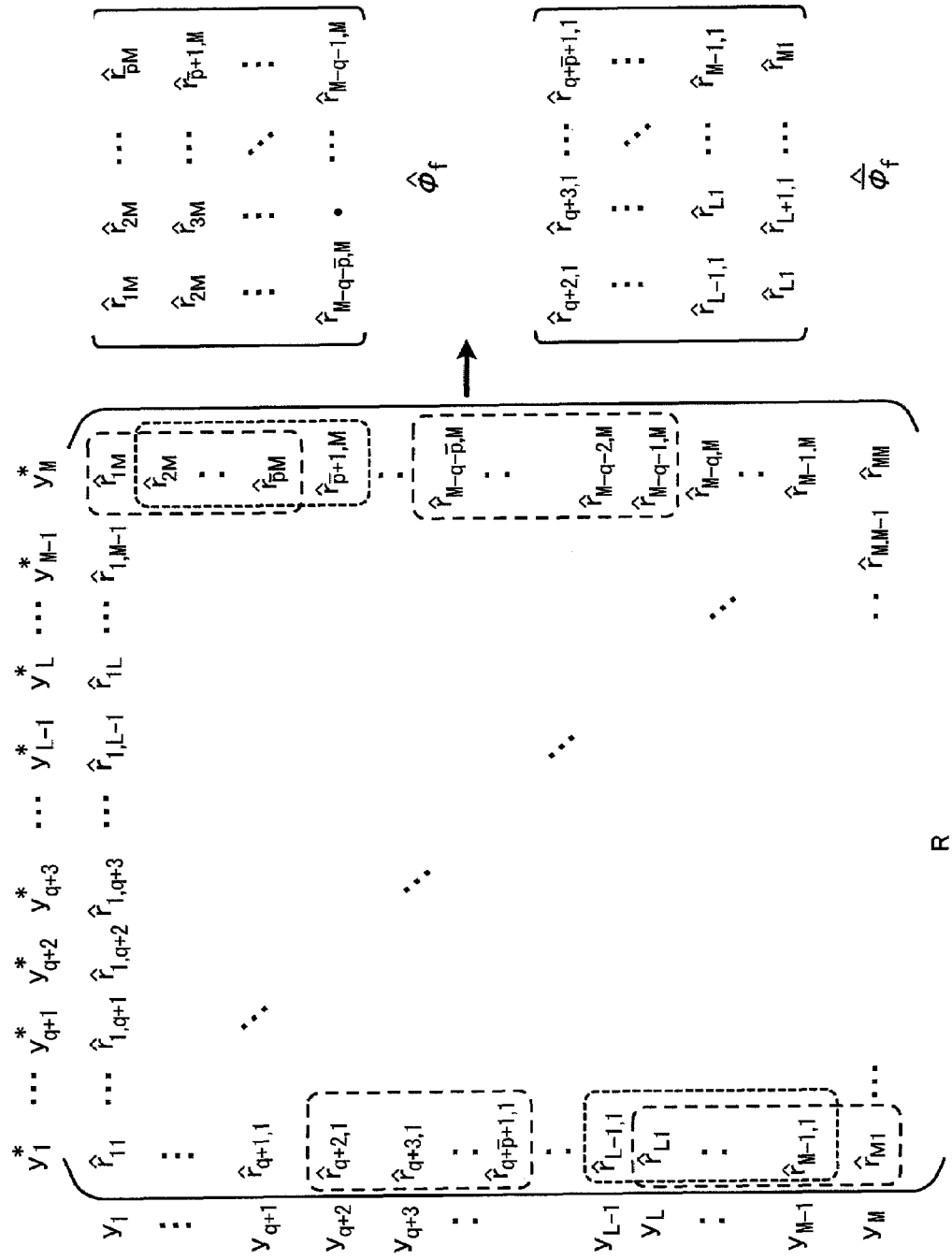
FIG. 10 is a diagram depicting column elements required for incoming direction estimation of radio waves in an array covariance matrix and Hankel matrix when the length of spatial correlation of noise is q.
Figure 11:
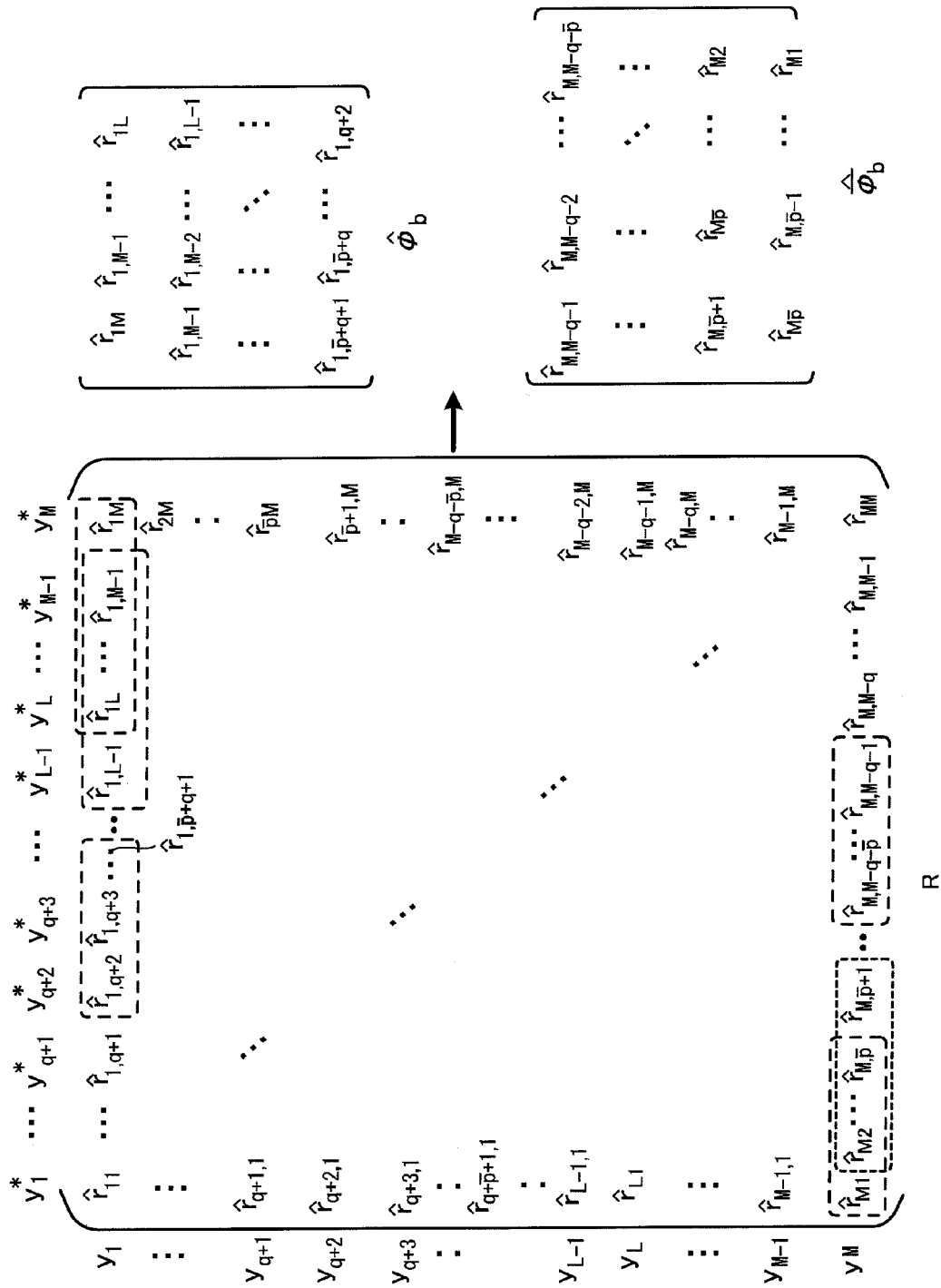
FIG. 11 is a diagram depicting row elements required for incoming direction estimation of radio waves in an array covariance matrix and Hankel matrix when the length of spatial correlation of noise is q.

Since the array covariance matrix R has conjugate symmetry, it is sufficient to calculate an arbitrary row or column of the array covariance matrix R for estimating the incoming direction, such as the first and last column, as shown in FIG. 10, or the first row and last row, as shown in FIG. 11. However noise is included in diagonal elements and in correlation elements at distance q from these diagonal elements, so these elements $\hat{r}_{11} \sim \hat{r}_{q+1,1}$, $\hat{r}_{M-q,M} \sim \hat{r}_{MM}$ are removed from each column, as shown in FIG. 10, or these elements $\hat{r}_{11} \sim \hat{r}_{1,q+1}$, $\hat{r}_{M,M-q} \sim \hat{r}_{MM}$ are removed from each row, as shown in FIG. 11.

Now an incoming direction estimation procedure for multiple waves in a spatially correlated noise environment in the incoming wave number estimation section 50 will be described. The correlation calculation means 51 calculates the (M−q−1) correlations between the receive signal of the M-th antenna element in the array antenna, and the receive signals of the first, second, . . . (M−q−1) th antenna elements of the array antenna, that is $\hat{r}_{1M}, \hat{r}_{2M}, \ldots, \hat{r}_{M-q-1,M}$ (see the last column in FIG. 10). Here M>2p+q, $0 \leq q<M-1$, $\bar{p}>p$, $\bar{p}=[M/2]$. Then as shown at the upper right of FIG. 10, the Hankel correlation matrix creation section 52 extracts $\bar{p}$ number of correlations (size of the sub-array) from (M−q−1) number of correlations of the last column, and extracts (M−$\bar{p}$)

sets of correlations while sequentially shifting one element at a time from the top to the bottom direction, and creates a correlation matrix $\hat{\Phi}_f$ of $(M-\bar{p})$ rows×$\bar{p}$ columns, where the correlation of each extracted set is sequentially arrayed in a matrix from the first row.

In the same way, the correlation calculation means 51 calculates $(M-q-1)$ number of correlations between the receive signal of the first antenna element and the receive signals of the $(q+2)$th, $(q+3)$th, . . . and M-th antenna elements in the array antenna, that is $\hat{r}_{q+2,1}, \hat{r}_{q+3,1}, \ldots, \hat{r}_{M,1}$ (see the first column in FIG. 10). Then as shown in FIG. 10, the Hankel correlation matrix formation section 52 extracts $\bar{p}$ number of correlations (size of the sub-array) from the $(M-q-1)$ number of correlations of the first column, and extracts $(M-\bar{p})$ sets of correlations, while sequentially shifting one element at a time from the top to the bottom direction, and creates a correlation matrix $$\hat{\Phi}_f$$

of $(M-\bar{p})$ rows×$\bar{p}$ columns, where a correlation of each extracted set is sequentially arrayed in a matrix from the first row.

Then a similar operation is also performed for rows, and the correlation matrices $\hat{\Phi}_b$, $$\hat{\Phi}_b$$

are created, as shown in FIG. 11.

If four Hankel correlation matrices are determined, the estimation matrix creation section 53 creates an estimation matrix using the following Expression (25).

$$\hat{\Phi} = \left[\hat{\Phi}_f, \check{\hat{\Phi}}_f, \hat{\Phi}_b, \check{\hat{\Phi}}_b\right] \quad (25)$$

If the estimation matrix is determined in this way, the incoming wave number can be estimated by a similar processing as the first embodiment. In other words, according to the third embodiment, the number of incoming signals of complete correlation signals (multiple wave), or partial correlation signals, or uncorrelation signals, can be estimated in a timely and spatially correlated noise environment.

Also just like the second embodiment, the incoming wave number of multiple waves in a spatially correlated noise environment can be estimated by creating an estimation matrix $\hat{\Phi}$ using an arbitrary combination of the four Hankel correlation matrices $$\hat{\Phi}_f, \check{\hat{\Phi}}_f, \hat{\Phi}_b, \check{\hat{\Phi}}_b.$$

(D) Fourth Embodiment

In the above embodiments, the incoming wave number is estimated according to the QR decomposition shown in Expression (17), but QR decomposition with column pivoting may be performed, instead of the QR decomposition in Expression (17). In QR decomposition with column pivoting, QR decomposition is performed by the following Expression (26)

$$\Psi\Pi = \hat{Q}\hat{R} \quad (26)$$

using the permutation matrix $\Pi$ of $(M-\bar{p})$ rows×$(M-\bar{p})$ columns.

In the QR decomposition with column pivoting in Expression (26), if the permutation matrix $\Pi$ is a unit matrix, such as $\Pi = I_{M-\bar{p}}$, then the result is the QR decomposition in Expression (17). In the QR decomposition with column pivoting (called "QRP"), the permutation matrix $\Pi$ can be determined so as to decrease the absolute value of the diagonal elements of the upper triangular matrix. Also a permutation matrix $\Pi$, which is determined in advance by column index maximum-difference bisection of the matrix $\Psi$, may be used (called "QRPP"). For example, if $M-\bar{p}=5$, then $\Pi = [e_1, e_2, e_3, e_4, e_5]$. Here $e_i$ is a unit vector of $(M-\bar{p}) \times 1$, and the $i$-th element thereof is 1, and other elements are 0.

Figure 12:
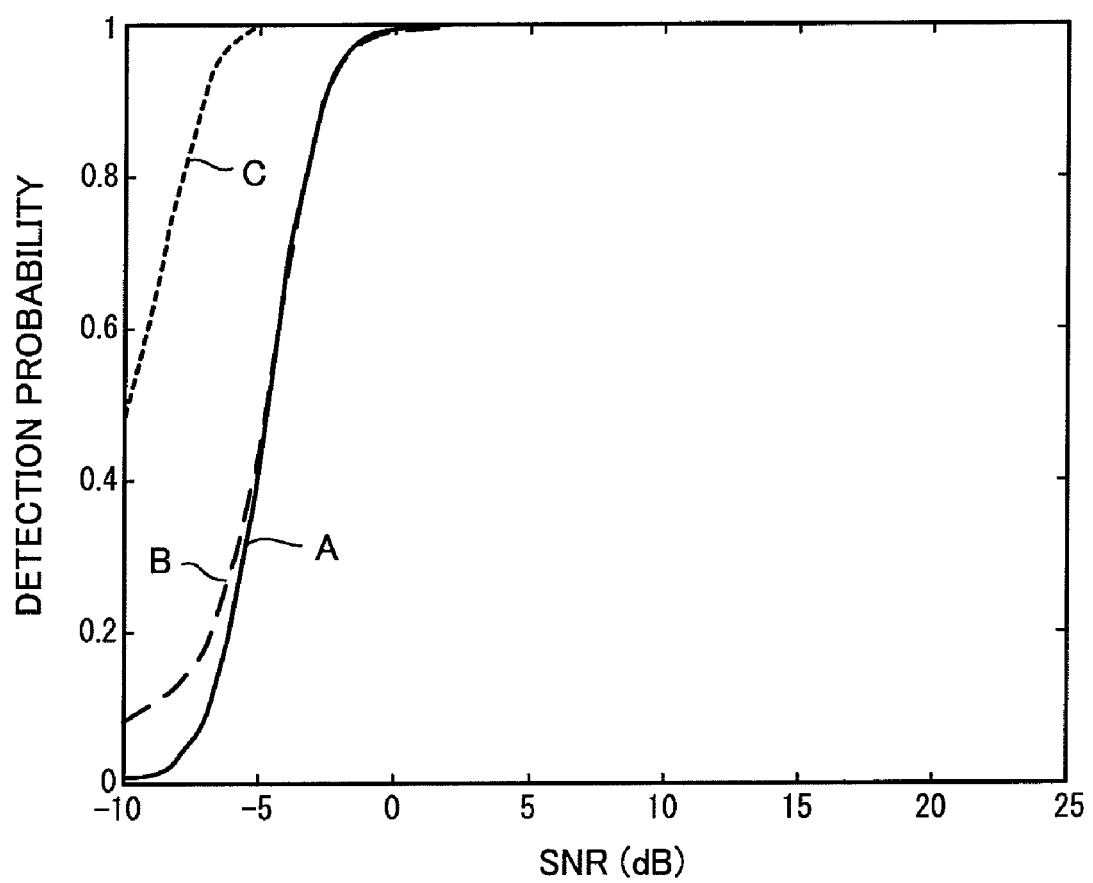
FIG. 12 is a characteristic diagram depicting a simulation result based on QR decomposition with column pivoting.

FIG. 12 is a simulation result based on the QR decomposition with column pivoting, of which measurement conditions are the same as the simulation in FIG. 7, and A is a detection probability characteristic of the first embodiment, B is a detection probability characteristic based on QRP, and C is a detection probability characteristic based on QRPP.

(E) Fifth Embodiment

Base Station Receive Device

Figure 13:
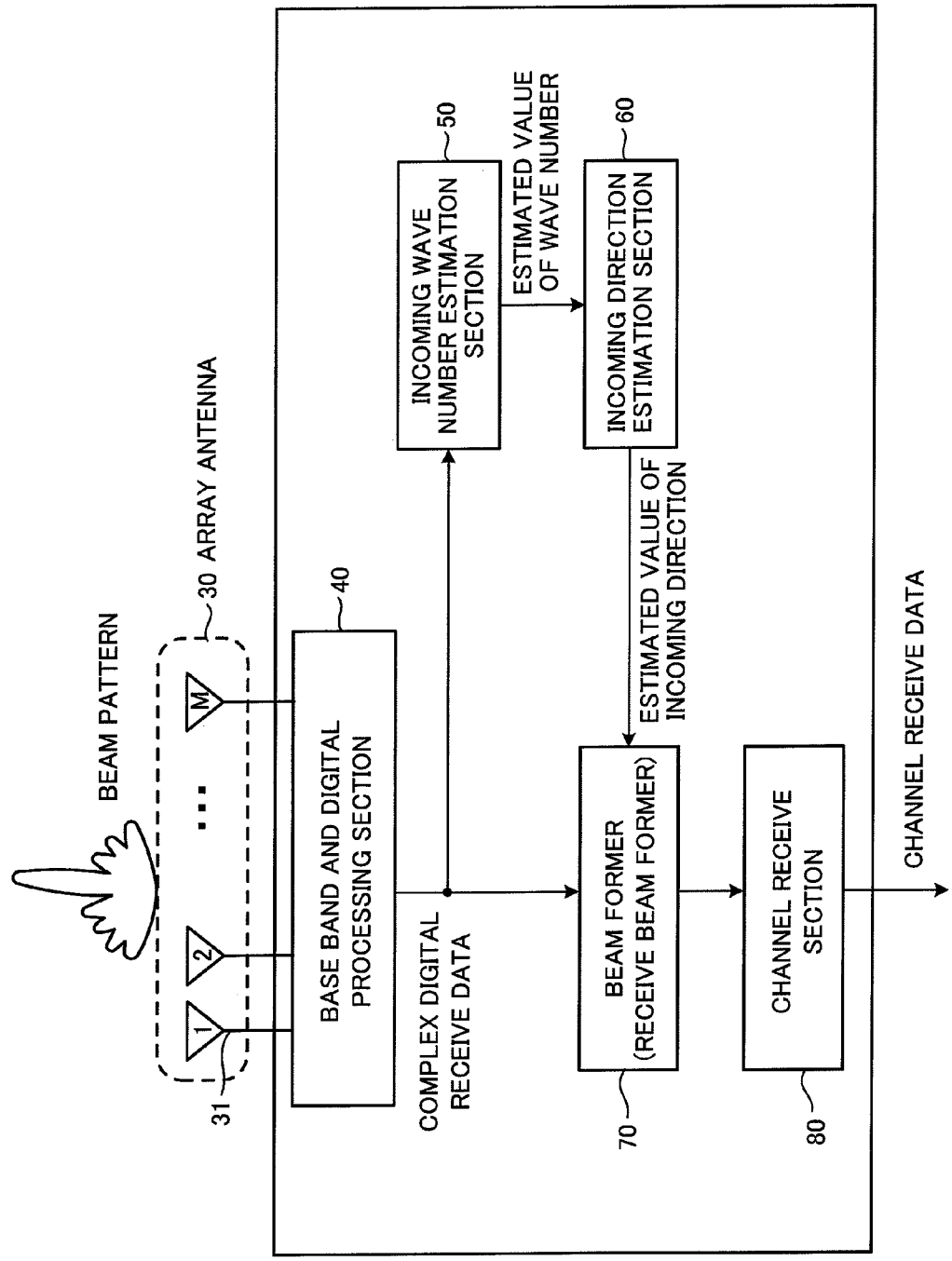
FIG. 13 is a block diagram depicting a base station receive device.

FIG. 13 is a diagram depicting a configuration of a base station receive device to which the present invention is applied. An array antenna 30 receives a signal, and inputs it to a base band and digital processing section 40. The digital processing section 40 processes the signal for each antenna element, and outputs complex digital receive data. An incoming wave number estimation section 50 estimates the number of incoming radio waves p using a method described in the first embodiment to fourth embodiment. An incoming direction estimation section 60 estimates an incoming direction of the signal using the complex digital receive data for each antenna element and the number of incoming radio waves p. For the incoming direction estimation method, see WO 2005/001504A1 and PCT/JP04/011598 (date of application: Aug. 12, 2004).

A beam former (receive beam former) 70 forms a beam using an estimated value of an incoming direction of the signal, obtained from the incoming direction estimation section 60 so as to have a peak in the signal source direction (receive beam forming). In other words, the beam former 70 extracts a desired signal while suppressing interference and noise, and sends it to a channel receive section 80. The channel receive section 80 performs the receive processing by a known method, and demodulates and outputs the receive data.

Various configurations are possible for the beam former 70, radio and signal can be received with turning the beam to the desired signal incoming direction using such a beam formation method as the one stated in O. L. Frost, "An algorithm for linearly constrained adaptive array processing," *Proc. IEEE*, vol. 60, No. 8, pp. 926-935 (1975) and J. Xin, H. Tsuji, Y. Hase, and A. Sano, "Array beam forming based on cyclic signal detection," *Proc. IEEE 48th Vehicular Technology Conference*, pp. 890-894, Ottawa, Canada (1998).

Base Station Transmission Device

Figure 14:
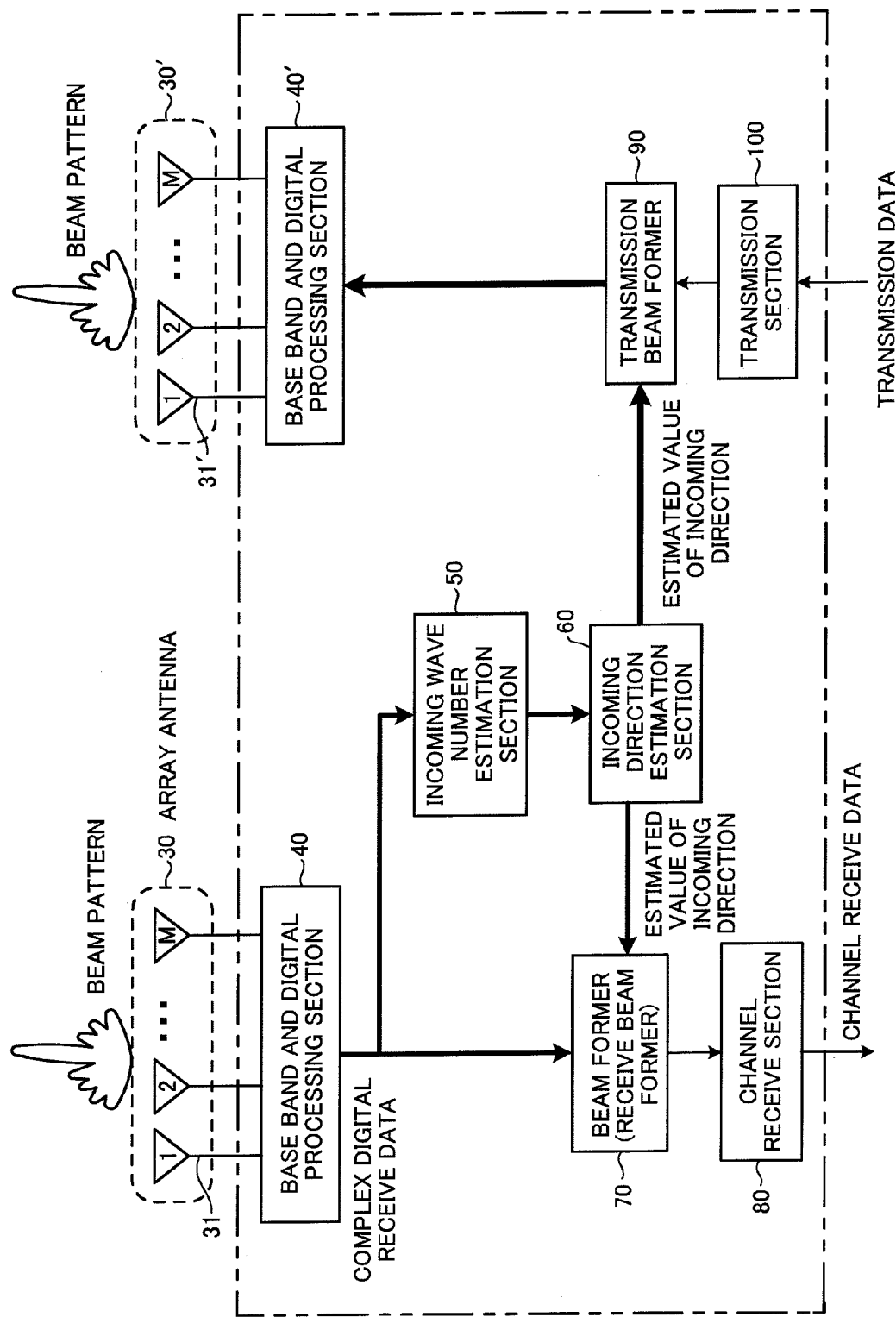
FIG. 14 is a block diagram depicting a transmission device.

FIG. 14 is a diagram depicting a configuration of a base station transmission device. In FIG. 14, a base station receive device is also shown.

When transmission data is input from a transmission section 100, a transmission beam former 90 forms a transmission beam pattern so that the peak turns to the direction estimated by an incoming direction estimation section 60, and inputs a complex digital transmission signal to a base band and digital signal processing section 40'. The signal processing section 40' converts the complex digital transmission data into radio signals, and inputs them to each antenna element of an array antenna 30'. As a result, a beam is emitted to the receive station, and the error rate can be decreased. The array antennas 30 and 30' in FIG. 14 have a common antenna.

The present invention can be applied when the incoming direction of multiple waves or partial correlation signals or uncorrelation signals are estimated or tracked on-line.

(F) Effect of the Invention

As described above, according to the present invention, the number of incoming waves, of which angles are spatially similar, can be estimated with a smaller computation volume without using eigen value decomposition. As concrete examples of the computer simulation showed, according to the present invention, the number of incoming waves which enter an array antenna in a base station can be estimated at high accuracy detection probability, even if the receive data length is short, or even if the signal-to-noise (SNR) ratio is low.

Also according to the present invention, excellent estimation performance can be implemented with a smaller computation volume compared with a conventional SS-AIC or SS-MDL method using eigenvalue decomposition.

Moreover, according to the present invention, a beam can be formed so that the beam turns to the signal source direction, reception quality can be improved, and interference during transmission can be minimized since a beam which has directivity in a desired direction can be formed.

What is claimed is:

1. A method for estimating the number of incoming radio waves by an array antenna in which a plurality (=M) of antenna elements are linearly arrayed with a same element spacing, and estimating the number of said incoming radio waves, comprising the steps of:
    calculating correlations between a receive signal of each antenna element and receive signals of all antenna elements of said array antenna to form an M×M array covariance matrix;
    creating a correlation matrix by:
        removing a diagonal element from a predetermined row or column of the covariance matrix;
        extracting a predetermined $\bar{p}$ number of correlations from (M−1) number of correlations after said diagonal element is removed to form a first row of the correlation matrix; and
        sequentially shifting one element at a time to form subsequent rows of the correlation matrix;
    creating an estimation matrix using said correlation matrix; and
    the estimating the number of incoming radio waves based on each row element of an upper triangular factor matrix obtained by performing QR decomposition on said estimation matrix.

2. The method for estimating the number of incoming radio waves according to claim 1, wherein when q (0>q>M−1) is a length of the spatial correlation of a noise, a diagonal element and q number of adjacent elements which are chained to said diagonal element, are removed from a predetermined row or column constituting said array covariance matrix, and said correlation matrix is created by extracting the predetermined $\bar{p}$ number of correlations from (M−q−1) number of correlations after (q+1) number of elements are removed while sequentially shifting one element at a time, and arraying the $\bar{p}$ number of correlations is a matrix.

3. The method for estimating the number of incoming radio waves according to claim 2, wherein the number of incoming signals is estimated for a complete correlation signal, or a partial correlation signal, or an uncorrelation signal in a correlated noise environment.

4. The method for estimating the number of incoming radio waves according to claim 1, wherein said correlation matrix is created for one or more of first row, last row, first column and last column of said array covariance matrix, and said estimation matrix is created by arranging the created correlation matrices.

5. The method for estimating the number of incoming radio waves according to claim 1, wherein said predetermined number $\bar{p}$ is set to be a maximum integer that is smaller than M/2.

6. The method for estimating the number of incoming radio waves according to any of claim 1, wherein a rank number of said upper triangular matrix factor is set to be the number of the incoming radio waves.

7. The method for estimating the number of incoming radio waves according to any of claim 1, wherein when a radio of a total sum of an absolute value of each matrix element in an i-th row and a total sum of an absolute value of each matrix element in a (i+1)th row of said upper triangular matrix factor is the minimum, i is determined as the number of the incoming radio waves.

8. The method for estimating the number of incoming radio waves according to claim 1, wherein said QR decomposition is a QR decomposition with column pivoting.

9. The method for estimating the number of incoming radio waves according to claim 1, wherein the number of incoming signals is estimated, the incoming signal being complete correlation signals, or partial correlation signals, or uncorrelation signals in an uncorrelated white noise environment.

10. A device for estimating the number of incoming radio waves by an array antenna in which a plurality (=M) of antenna elements are linearly arrayed with a same element spacing, and estimating the number of said incoming radio waves, comprising:
    a correlation computation section for calculating correlations between a receive signal of each antenna element and receive signals of all antenna elements of said array antenna to form an M×M array covariance matrix;
    a correlation matrix creation section for removing a diagonal element from a predetermined row or column of the covariance matrix extracting a predetermined $\bar{p}$ number of correlations from (M−1) number of correlations after said diagonal element is removed to form a first row of the correlation matrix; and sequentially shifting one element at a time to form subsequent rows of the correlation matrix;
    an estimation matrix creating section for creating an estimation matrix using said correlation matrix;
    a QR decomposition matrix section for performing QR decomposition on said estimation matrix; and
    a number of incoming radio wave determination section for determining the number of incoming radio waves base on each row element of an upper triangular factor matrix obtained by QR decomposition.

11. The incoming wave number estimation device according to claim, 10, wherein when q (0>q>M−1) is a length of the spatial correlation of a noise, said correlation matrix creation section removes a diagonal element and q number of adjacent elements which are chained to said diagonal element, from a predetermined row or column constituting said array covariance matrix, and creates said correlation matrix by extracting the predetermined $\bar{p}$ number of correlation from (M−q−1) number of correlations after (q+1) number of elements are removed while sequentially shifting one element at a time, and arraying the $\bar{p}$ number of correlations in a matrix.

12. The method for estimating the number of incoming radio waves according to claim, 10, wherein said correlation matrix creation section creates said correlation matrix for one or more of first row, last row, first column and last column of said array covariance matrix, and said estimation matrix creation section creates said estimation matrix by arraying the created correlation matrices.

13. The method for estimating the number of incoming radio waves according to claim, 10, wherein said correlation matrix creation section sets said predetermined number $\bar{p}$ to be a maximum integer that smaller that M/2.

14. The method for estimating the number of incoming radio waves according to claim, 10, wherein said incoming wave number determination section sets a rank number of said upper triangular matrix factor to be the number of the incoming radio waves.

15. The method for estimating the number of incoming radio waves according to claim, 10, wherein said incoming wave number determination section comprises a calculation section for calculation a ration of a total sum of an absolute value of each matrix element in an i-th row and a total sum of an absolute value of each matrix element in a (i+1)th row of said upper triangular matrix factor, and a determination section for determining i, with which said ratio is the minimum, as the number of the incoming radio waves.

16. The method for estimating the number of incoming radio waves according to claim 10, wherein said QR decomposition section performs a QR decomposition with column pivoting as the QR decomposition.

17. A radio device for receiving incoming radio waves by an array antenna in which a plurality (=M) of antenna elements are linearly arranged with a same element spacing, and estimating incoming directions of said radio waves, comprising:

a number of incoming radio wave number estimation section for estimating the number of incoming radio waves;

an incoming direction estimation section for estimating an incoming direction of a signal using receive data for each antenna element and the number of incoming radio waves; and a receive beam former for performing receive beam forming processing using the incoming direction estimation value so as to have a peak in a signal source direction, wherein said number of incoming radio ware number estimation section comprises:

a correlation computation section for calculating correlations between a receive signal of each antenna element and receive signals of all antenna elements of said array antenna to form an M×M array covariance matrix;

a correlation matrix creation section for removing a diagonal element from a predetermined row or column of the covariance matrix extracting a predetermined $\bar{p}$ number of correlations from (M−1) number of correlations after said diagonal element is removed to form a first row of the correlation matrix; and sequentially shifting one element at a time to form subsequent rows of the correlation matrix;

an estimation matrix creating section for creating an estimation matrix using said correlation matrix;

a QR decomposition matrix section for performing QR decomposition on said estimation matrix; and a number of incoming radio wave determination section for determining the number of incoming radio waves base on each row element of an upper triangular factor matrix obtained by QR decomposition.

18. The ratio device according to claim 17, wherein when q (0>q>M−1) is a length of the spatial correlation of a noise, said correlation matrix creation section removes a diagonal element and q number of adjacent elements which are chained to said diagonal element, from a predetermined row or column constituting said array extracting the predetermined $\bar{p}$ number of correlations from (M−q−1) number of correlations after (q+1) number of elements are removed while sequentially shifting one element at a time, and arraying the $\bar{p}$ number of correlations in a matrix.

19. The ratio device according to claim 17, wherein the ratio section comprises transmission beam formation means for generating a beam so that the peak faces to a direction estimated by said ratio wave incoming direction estimated section.

* * * * *